United States Patent [19]

Moliner et al.

[11] 3,997,755

[45] Dec. 14, 1976

[54] ELECTRODE SPECIALLY FOR WELDING STUDS IN HEAT EXCHANGER TUBES

[75] Inventors: Jose Gasulla Moliner, Bilbao; Amador Royo Rivas, Portugalete (Bilbao), both of Spain

[73] Assignee: "OGIPSA" Oleoductos, Gaseoductos e Instalaciones Petroliferas, S.A., Bilboa, Spain

[22] Filed: Apr. 9, 1974

[21] Appl. No.: 412,788

[52] U.S. Cl. .............................. 219/120; 219/98; 219/119

[51] Int. Cl.$^2$ ..................................... B23K 11/30

[58] Field of Search ............. 219/98, 99, 103, 107, 219/119, 120; 174/126 CP

[56] References Cited

UNITED STATES PATENTS

| | | | |
|---|---|---|---|
| 1,982,098 | 11/1934 | Hartmann | 219/98 X |
| 2,231,480 | 2/1941 | Pilger | 219/99 X |
| 2,311,138 | 2/1943 | Swartz | 174/126 CP |

*Primary Examiner*—E. A. Goldberg
*Attorney, Agent, or Firm*—Woodcock, Washburn, Kurtz & Mackiewicz

[57] ABSTRACT

A head assembly for electrically welding a stud to a metallic substrate. The outer portion of the head is formed of a highly conductive material such as copper, and has a bore therewithin which terminates in a conical surface for engaging the underside of the head of a stud to be welded. Disposed within the bore is a nickel sleeve for retaining the shank of the stud, and a magnet for holding the stud in place. In a preferred embodiment the magnet is spring-loaded and coupled to a microswitch which actuates a control mechanism.

3 Claims, 2 Drawing Figures

ELECTRODE SPECIALLY FOR WELDING STUDS IN HEAT EXCHANGER TUBES

Conventionally, there are heat exchangers tubes which, for increasing their useful exchange surface, are provided of a plurality of studs of any section (square, circular, elliptic, etc.) welded around them and in the axial direction thereof.

In this type of tubes, as can be clearly understood, a must is that the welding of the studs on the surface of the tube be as complete as possible. This is principally because high efficiency of the equipment is required, and for this reason an absolute integral contact between the parts is necessary.

The tubes which up to now included studs welded to them by conventional process are subject to a significant erosion which originates in not welded or improperly welded joints and also a corrosion under tension, originated by a deposit of copper coming from the welding electrodes and on account to the friction of the studs against the inside walls thereof.

The object of the invention described in this specification, is to provide an electrode for multiple applications, and with which the preceding serious drawbacks can be eliminated.

In general, the novel electrode according to the invention is characterized in a copper-free sheath, with a section adapted to house the body of the stud which is to be welded, followed at the open end thereof by an enlarged part of good electric conductibility and with such a configuration that it can be fitted to the enlarged part formed on the studs. However, this part lacks a guiding element which can exert a friction against the body of said stud.

The described unit is sustained by a hollow cylindrical body which allows the coupling of the electrode to the welding device and the transmission of the electric current to the head of said stud. This stud is held in place by a magnet which slides through an insulated sleeve, in such a manner that said magnet abuts, through a shaft and a spring, a microcontactor which acts to close a circuit when the stud is pushed completely inside the welding head.

The pecularities and prominent features of the electrode according to the invention, rather than through the merely literal explanation given up to this point, will be clearly understood by means of the following description of the drawings which are given merely as an example and in which a preferred practical embodiment of the invention is described.

Figure 1:
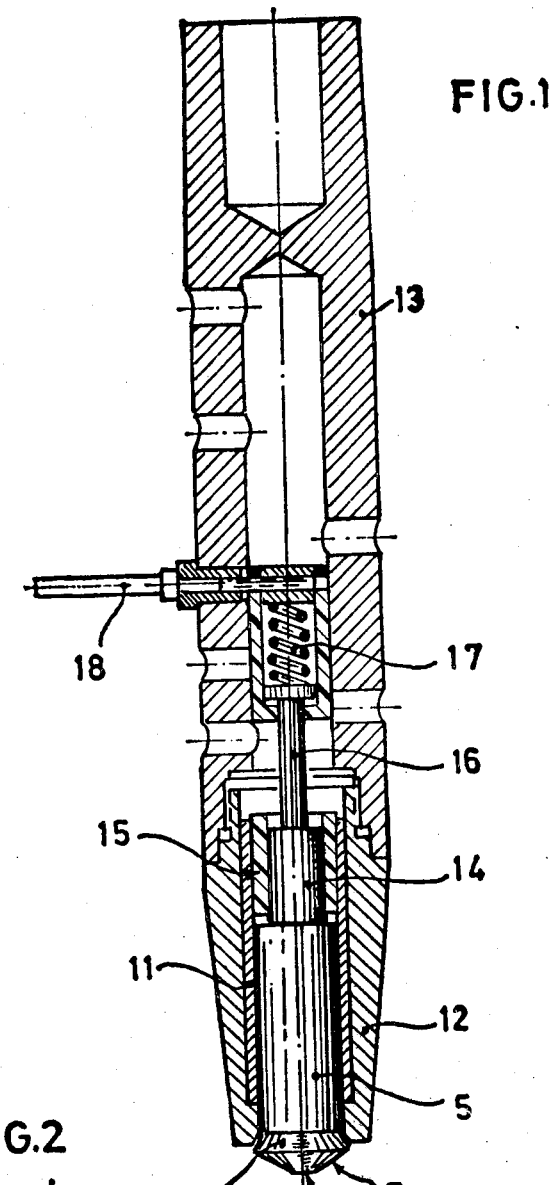
FIG. 1 shows an axial section of the welding electrode according to the invention.

For a better understanding it must be said that the electrode according to the invention is specifically designed to carry out the welding of the head of stud 5 in the wall of tube or like element 9. To this purpose, said head is formed with an enlarged zone of truncated cone shape 6, finished by a bulged part 7 terminated by a slight flattening 8. This end is set under pressure over the tube 9 and welded in it on a surface more extended that of the proper stud body.

To this end, the stud is guided by the sheath 11 made out of copper-free nickel, which is supported by the welding head 12 and embraces the stud body only at a reduced height, and conducts the welding current to the truncated cone head 6, which enlarged open end is adapted to the profile.

While that has not been shown, it can be understood that the pressure on the stud in the longitudinal direction of the tube, and the specific action of the electrode, cause the melting of the bulged part of the head abutting to said tube.

To this end the material of welding head 12 has a better electric conductibility than the nickel sheath 11, wherefore the latter will carry the current in a preferential mode to the head 6 of the stud.

Since the only object of the head 12 is to set under pressure the stud on the tube, only its enlarged bearing surfaces will be in contact with the latter. However the slight excess of diameter of the orifice in this head can form a clearance within sheath 11 such that no friction nor deposit of metal will occur. For this reason, the welding head can be formed of alloyed copper, cobalt, beryllium, as well as copper which exhibits a conductibility 6 to 7 times better than nickel.

The assembly is supported by a cylindrical hollow body 13, for example, made out of the same copper alloy, which allows the fastening of the welding device and the transferring of the current to the stud head which is introduced in the latter.

The above described stud is initially held with a magnet 14, which slides through the sleeve 15. Said magnet bears on a shaft 16 and through the pressure of an intervening spring 17, with a micro contactor 18 which closes when the stud is pushed completely inside the welding head.

The said closing of the microcontactor may effect the opening of a valve (not shown) which controls, for example, an air pressure circuit for the feed cylinder of the electrode and the connection of electric current when the heads of the welding device and of the stud contact each other.

Figure 2:
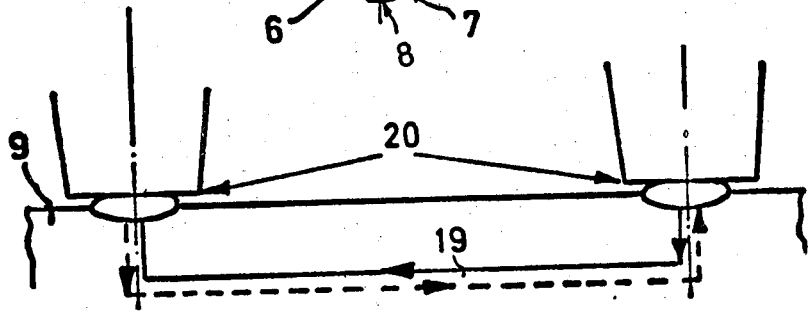
FIG. 2 shows diagramatically the flowing of the current during the formation of a welded joint.

As it is shown in FIG. 2, the current will flow between the two adjacent heads 20, following path 19 through tube 9.

With the electrode according to the invention, it is possible to weld studs of any grade on steel tubes of the same or different grade.

Since the current flows only through the stud heads the welded joint is localized and can be carried out rapidly, and the operation does not allow sufficient time to heat the whole stud, as in the prior process.

Owing to the special shape of the electrode according to the invention the casting of the melted metal is carried out without contact with the air, which results in welded joints of a metallurgical quality never reached before. Likewise a current saving, resulting from the concentration of all the electric power in the welded point, is attained.

We claim:

1. An improved electrode for welding studs having enlarged heads thereon to the surface of a heat exchager tube, comprising:
    a welding head formed of a metal exhibiting a high electrical conductivity, said welding head having a bore formed therewithin, said bore opening in a conical orifice formed to accept the enlarged head of a stud and having a first, smaller diameter adjacent said orifice and a second, larger diameter distant from said orifice;
    a hollow cylindrical sheath for guiding the stud, said sheath seating in said larger diameter of said bore and being formed of a conductive metal which is substantially less conductive than said welding head.

2. An improved electrode in accordance with claim 1, further including a magnet disposed adjacent one end of said sheath for retaining therein a stud; a contact for controlling at least in part the initiation of a welding operation; a spring disposed between said contact and said magnet; said contact, spring and magnet being oriented such that the penetration of a stud within said sheath urges said magnet against said spring to effect operation of said contact.

3. An improved electrode in accordance with claim 1, further including cooling means formed in said electrode to effect cooling thereof at least during a welding period.

* * * * *